(12) United States Patent
Ishimoto et al.

(10) Patent No.: US 7,783,825 B2
(45) Date of Patent: Aug. 24, 2010

(54) NONVOLATILE MEMORY SYSTEM AND MANAGEMENT METHOD FOR NONVOLATILE MEMORY

(75) Inventors: Takeshi Ishimoto, Kanagawa (JP); Daisuke Yoshioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 645 days.

(21) Appl. No.: 11/713,725

(22) Filed: Mar. 5, 2007

(65) Prior Publication Data
US 2007/0214310 A1 Sep. 13, 2007

(30) Foreign Application Priority Data
Mar. 10, 2006 (JP) .............................. 2006-066623

(51) Int. Cl.
*G06F 12/10* (2006.01)
(52) U.S. Cl. ..................... 711/103; 711/202; 711/203; 711/209
(58) Field of Classification Search ............. 711/5, 711/103, 202–203, 205–207, 209, 12.007
See application file for complete search history.

(56) References Cited
U.S. PATENT DOCUMENTS

| | | | |
|---|---|---|---|
| 6,757,800 B1 | 6/2004 | Estakhri et al. | |
| 7,020,739 B2 * | 3/2006 | Mukaida et al. | 711/103 |
| 7,472,331 B2 * | 12/2008 | Kim | 714/763 |
| 2006/0075207 A1 * | 4/2006 | Togawa et al. | 711/202 |

* cited by examiner

*Primary Examiner*—Jasmine Song
(74) *Attorney, Agent, or Firm*—Rader, Fishman & Grauer PLLC (57) ABSTRACT

A nonvolatile memory system includes a nonvolatile memory and a controller. The controller is configured to manage the nonvolatile memory based on management information. The management information of the controller includes a basic table for collectively managing a plurality of blocks and differential information between the blocks. The controller is operable to manage the blocks collectively with the basic table and manage different portions of the blocks within the collected range using the differential information.

12 Claims, 13 Drawing Sheets

| virtual | A | B | C | D |
|---------|-----|-----|-----|-----|
| fff | ggg | fff | fff | hhh |
| ggg | fff | ggg | ggg | ggg |
| hhh | hhh | hhh | hhh | fff |
| ⋮ | ⋮ | ⋮ | ⋮ | ⋮ |

FIG.9

| virtual | A | B | C | D |
|---------|-----|-----|-----|-----|
| fff | ggg | fff | fff | hhh |
| ⋮ | ⋮ | ⋮ | ⋮ | ⋮ |

# NONVOLATILE MEMORY SYSTEM AND MANAGEMENT METHOD FOR NONVOLATILE MEMORY

CROSS REFERENCES TO RELATED APPLICATIONS

The present invention contains subject matter related to Japanese Patent Application JP 2006-066623 filed with the Japanese Patent Office on Mar. 10, 2006, the entire contents of which are incorporated herein by reference.

BACKGROUND OF THE INVENTION

1. Field of the Invention

This invention relates to a nonvolatile memory system which includes a controller and a nonvolatile memory, such as a flash memory, and a management method for a nonvolatile memory.

2. Description of the Related Art

Usually, for address management for a nonvolatile memory which includes a plurality of memory banks, a method wherein the memory banks are managed independently of each other and another method wherein the memory banks are managed collectively are available. The latter method is disclosed, for example, in U.S. Pat. No. 6,757,800 (hereinafter referred to as Patent Document 1).

SUMMARY OF THE INVENTION

In the method wherein memory banks are managed independently of each other, as the number of memory banks increases, the table size necessary for address management of the memory banks increases proportionately. Therefore, the method has a problem in that the necessary RAM size increases or all information may not be placed at a time into a RAM, resulting in an increase of the cost or deterioration of the performance.

On the other hand, the method wherein a plurality of banks are managed collectively as disclosed in Patent Document 1 can suppress such increase of the table size.

Figure 1:
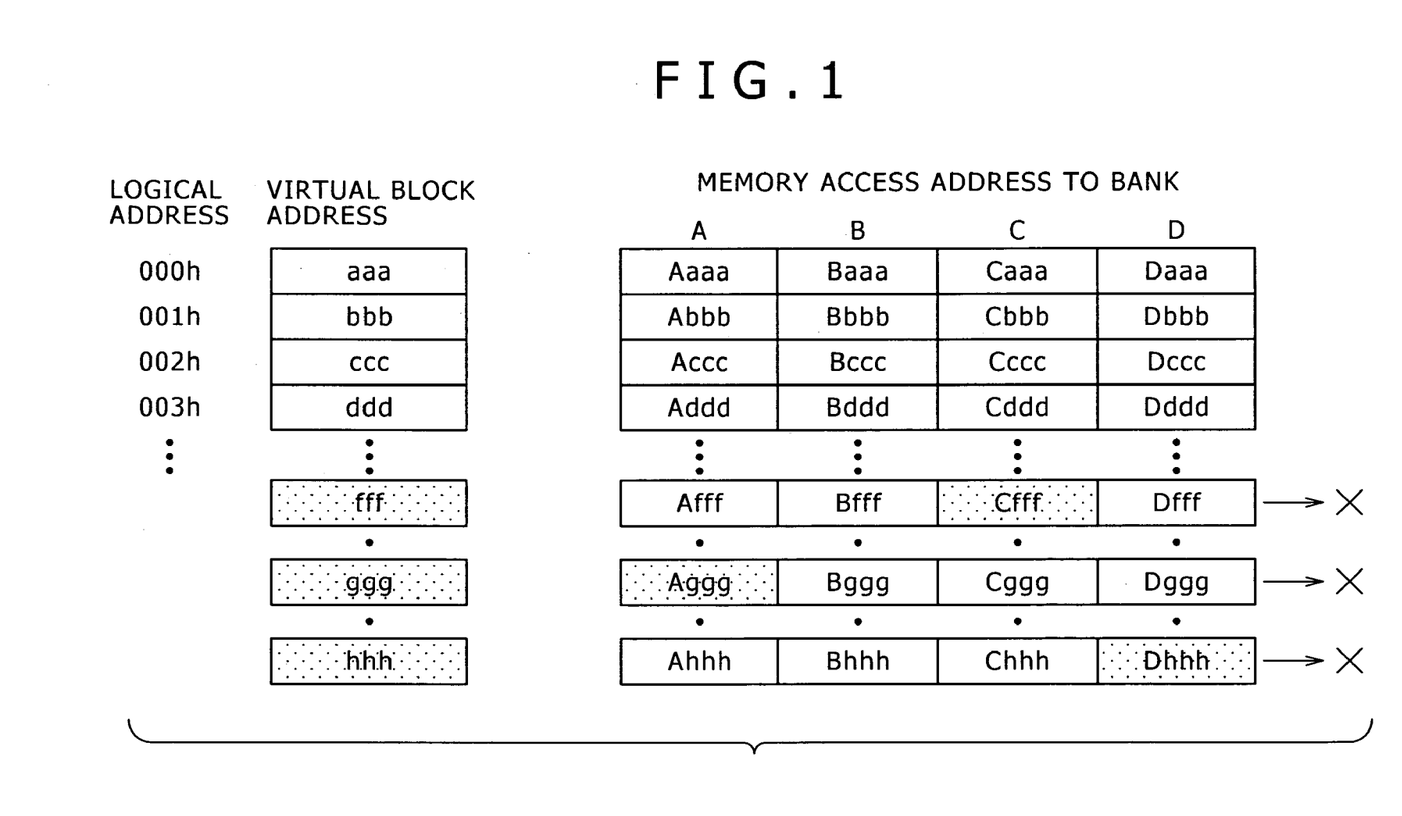
FIG. 1 is a diagrammatic view illustrating a subject to be solved by the present invention.

However, blocks of the same address in different memory banks within a collected range are treated equally. Therefore, if one of the blocks fails and is disabled from being used as seen in FIG. 1, then the blocks of all of the memory banks which have the same address have to be inhibited from being used. Consequently, the method is disadvantageous in that the number of apparently failed blocks increases to a number of times equal to the number of memory banks with respect to the number of actually failed blocks.

Therefore, it is desirable to provide a nonvolatile memory system and a management method for a nonvolatile memory wherein the number of apparently failed blocks does not increase very much from the number of actually failed blocks while the table size necessary for address management is kept small.

To this end, according to the present invention, within the method wherein a plurality of banks are managed collectively, a replacement process of a failed block is performed.

More particularly, according to an embodiment of the present invention, there is provided a nonvolatile memory system including a nonvolatile memory and a controller configured to manage the nonvolatile memory based on management information, the management information of the controller including a basic table for collectively managing a plurality of blocks and differential information between the blocks, and the controller being operable to manage the blocks collectively with the basic table and manage different portions of the blocks within the collected range using the differential information.

Preferably, the controller replaces one or more of the collected blocks with another block or blocks using the differential information.

The replacement may be performed within a range of a bank, a chip or a partial region.

Alternatively, the replacement may be performed within a range which extends across chips, across banks or across partial regions.

Preferably, the nonvolatile memory has a plurality of banks, and the controller can perform accessing for each of the banks based on an address and collect a plurality of blocks of different ones of the blocks having the same bank internal address across the banks.

Preferably, the nonvolatile memory system may be configured such that the nonvolatile memory includes a plurality of nonvolatile memory sections formed on different chips from each other, and the controller can perform accessing for each of the chips based on an address and collect a plurality of blocks of the chips having a same address across the chips.

Preferably, the controller collects a plurality of blocks having a same partial address between a plurality of partial regions.

Preferably, the controller includes a physical address to physical address conversion table for block replacement as the differential information.

In this instance, preferably, the controller sets a flag to an object of the physical address to physical address conversion on a logical address to physical address conversion table which is used as the basic table.

Further, preferably, the controller adds an index to a conversion table to a block of an object of the physical address to physical address conversion on the logical address to physical address conversion table which is used as the basic table.

Preferably, the controller collectively manages a plurality of blocks and exchanges an access to a failed block into an access to another address.

According to another embodiment of the present invention, there is provided a management method for a nonvolatile memory for managing access to the nonvolatile memory, wherein management information to be used for managing the nonvolatile memory includes a basic table for collectively managing a plurality of blocks and differential information between the blocks, and the blocks are managed collectively with the basic table while different portions of the blocks are managed within the collected range using the differential information.

With the nonvolatile memory system and the management method for a nonvolatile memory, fine management can be achieved while the management table size is kept small.

For example, it is possible to reduce the number of apparently failed blocks significantly, and the utilization efficiency of the blocks is improved significantly. The improvement of the utilization efficiency results in an increase of the effective capacity and a reduction of the system cost.

Further, the number of blocks of an object of management can be increased without deteriorating the utilization efficiency while the management table size is kept small. Consequently, a nonvolatile memory system of a large storage capacity can be constructed.

The above and other objects, features and advantages of the present invention will become apparent from the following description and the appended claims, taken in conjunction

DETAILED DESCRIPTION OF THE PREFERRED EMBODIMENT

Figure 2:
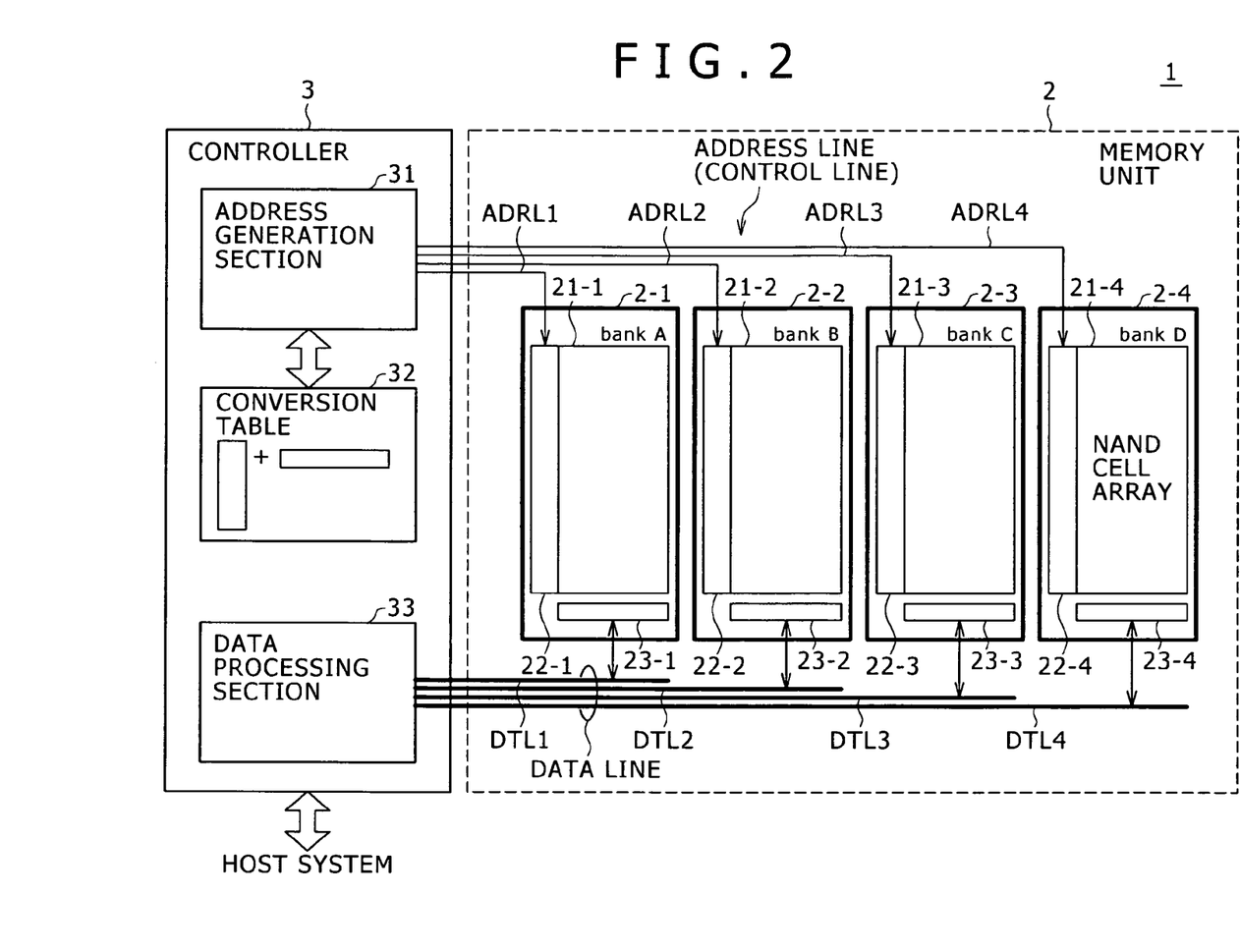
FIG. 2 is a block diagram showing an example of a configuration of a nonvolatile memory system to which the present invention is applied.

FIG. 2 shows an example of a configuration of a nonvolatile memory system to which the present invention is applied.

Referring to FIG. 2, the nonvolatile memory system 1 includes a nonvolatile memory unit 2 (hereinafter referred to as a memory unit in some cases) having a plurality of memory banks 2-1 to 2-*n* (in the example of FIG. 2, n=4) and a controller 3 for controlling accessing to the nonvolatile memory unit 2 in response to a request from a host system (not shown).

The memory banks 2-1 (bank A), 2-2 (bank B), 2-3 (bank C) and 2-4 (bank D) have configurations similar to each other and include a memory cell array 21 (21-1 to 21-4), an address decoder 22 (22-1 to 22-4), and a page buffer 23 (23-1 to 23-4).

The memory cell array 21 is formed from, for example, a NAND type flash memory cell array.

The address decoder 22-1 of the memory bank 2-1 is connected to the controller 3 by an address line ADRL1. Similarly, the address decoder 22-2 of the memory bank 2-2 is connected to the controller 3 by an address line ADRL2; the address decoder 22-3 of the memory bank 2-3 is connected to the controller 3 by an address line ADRL3; and the address decoder 22-4 of the memory bank 2-4 is connected to the controller 3 by an address line ADRL4.

The page buffer 23-1 of the memory bank 2-1 is connected to the controller 3 by a data line DTL1. Similarly, the page buffer 23-2 of the memory bank 2-2 is connected to the controller 3 by a data line DTL2; the page buffer 23-3 of the memory bank 2-3 is connected to the controller 3 by a data line DTL3; and the page buffer 23-4 of the memory bank 2-4 is connected to the controller 3 by a data line DTL4.

The memory banks 2-1 to 2-4 use an address received through the address lines ADRL1 to ADRL4 to access the cell arrays 21-1 to 21-4 of the nonvolatile memory unit 2 to write data received from the controller 3 into a pertaining location or to transmit data read out from a pertaining location to the controller 3.

While the address lines used by the controller 3 to transmit addresses and the data lines used by the controller 3 to transfer data to and from the controller 3 are provided separately from each other in FIG. 2, common lines may be used otherwise as the address lines and data lines using a multiplexing method as in an ordinary NAND flash memory unit. The configuration just described provides the merit that the number of transmit lines between the controller and the memory unit can be reduced.

Also, it is possible to share transmit lines among a plurality of banks by using a bank selection method separately.

Figure 3:
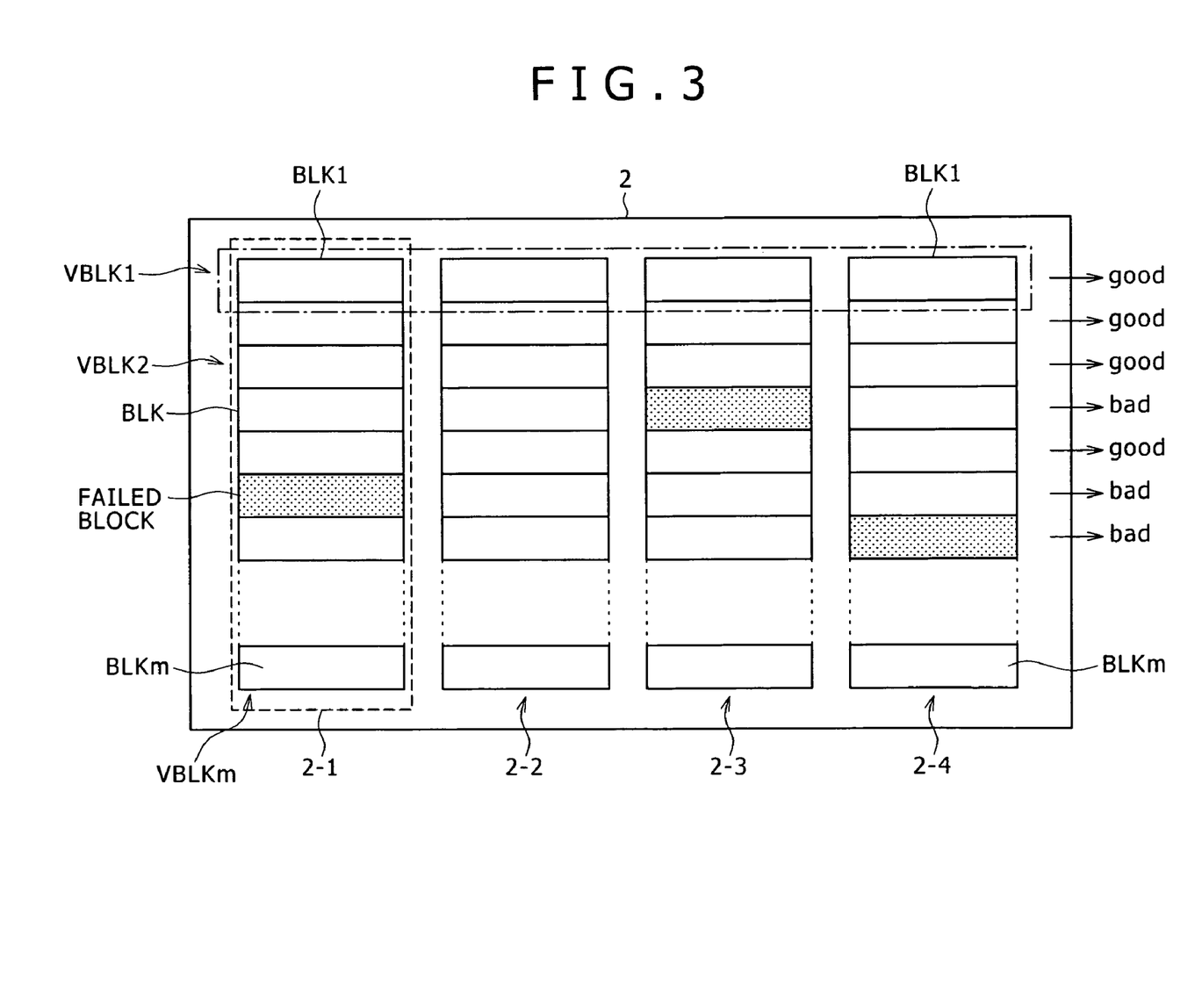
FIG. 3 is a diagrammatic view illustrating a concept of a memory region of a memory unit shown in FIG. 2.
Figure 4:
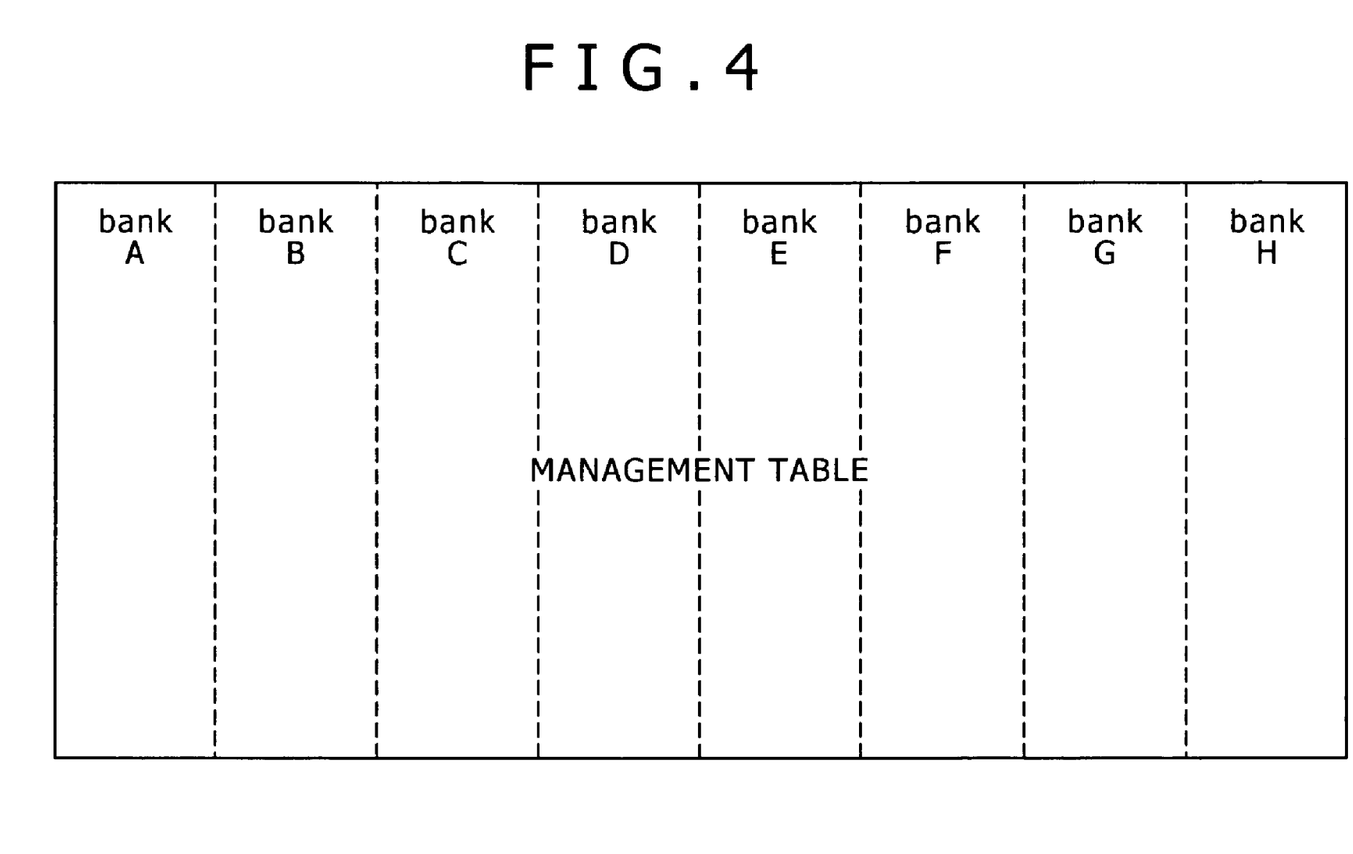
FIG. 4 is a diagrammatic view illustrating an example of an ordinary flash management table.

FIG. 3 illustrates a concept of a memory region of the nonvolatile memory unit 2 of FIG. 2.

In the nonvolatile memory unit 2, each of the memory banks (hereinafter referred to as a bank in some cases) 2-1 to 2-4 includes a plurality of memory blocks BLK1 to BLKm.

A virtual block VBLK (VBLK1 to VBLKm) is formed from a collection of a plurality of blocks at the same memory bank internal address in the memory banks 2-1 to 2-4.

The virtual block VBLK is treated as a management unit by the controller 3, as hereinafter described.

The memory banks here may be provided on separate chips from each other or provided as different regions in the same chip if they include a plurality of blocks and have the same structure.

The controller 3 manages the nonvolatile memory unit 2 based on management information. The management information of the controller 3 is divided into a basic table for managing a plurality of blocks collectively and differential information between the blocks. The controller 3 manages a plurality of blocks collectively with the basic table and manages different portions in the collected range using the differential information.

The controller 3 replaces one or more blocks of a collected block with another block or blocks based on the differential information.

In the present embodiment, the nonvolatile memory unit 2 includes a plurality of memory banks 2-1 to 2-4 as described above, and the controller 3 can access the memory banks 2-1 to 2-4 individually based on an address and collect a plurality of blocks in the different banks having the same bank internal address as a virtual block VBLK across the banks.

The controller 3 includes an address generation section 31, an address conversion table 32 and a data processing section 33, as seen in FIG. 2.

The address generation section 31 generates an address for accessing the nonvolatile memory unit 2 based on the management information of the address conversion table 32 and transfers the generated address to the memory banks 2-1 to 2-4 through the address lines ADRL1 to ADRL4. The address generation section 31 can transmit a plurality of addresses to different memory banks.

Each of the memory banks 2-1 to 2-4 accesses a cell array of the nonvolatile memory unit 2 using the received address and writes data received from the controller 3 into a pertaining location or transmits data read out from a pertaining location to the controller 3.

The data processing section 33 transmits data received from the host system to the data lines DTL1 to DTL4 in order to write the data into a pertaining location of the memory banks 2-1 to 2-4 at a designated address of the nonvolatile memory unit 2 and transmits data read out from a pertaining location to the host system.

The address conversion table 32 is divided into a basic table for managing a plurality of blocks collectively with management information and differential information between blocks.

In the following, a configuration and a control function based on the management information of the controller 3 of the nonvolatile memory system 1 of the present embodiment are described.

Figure 5:
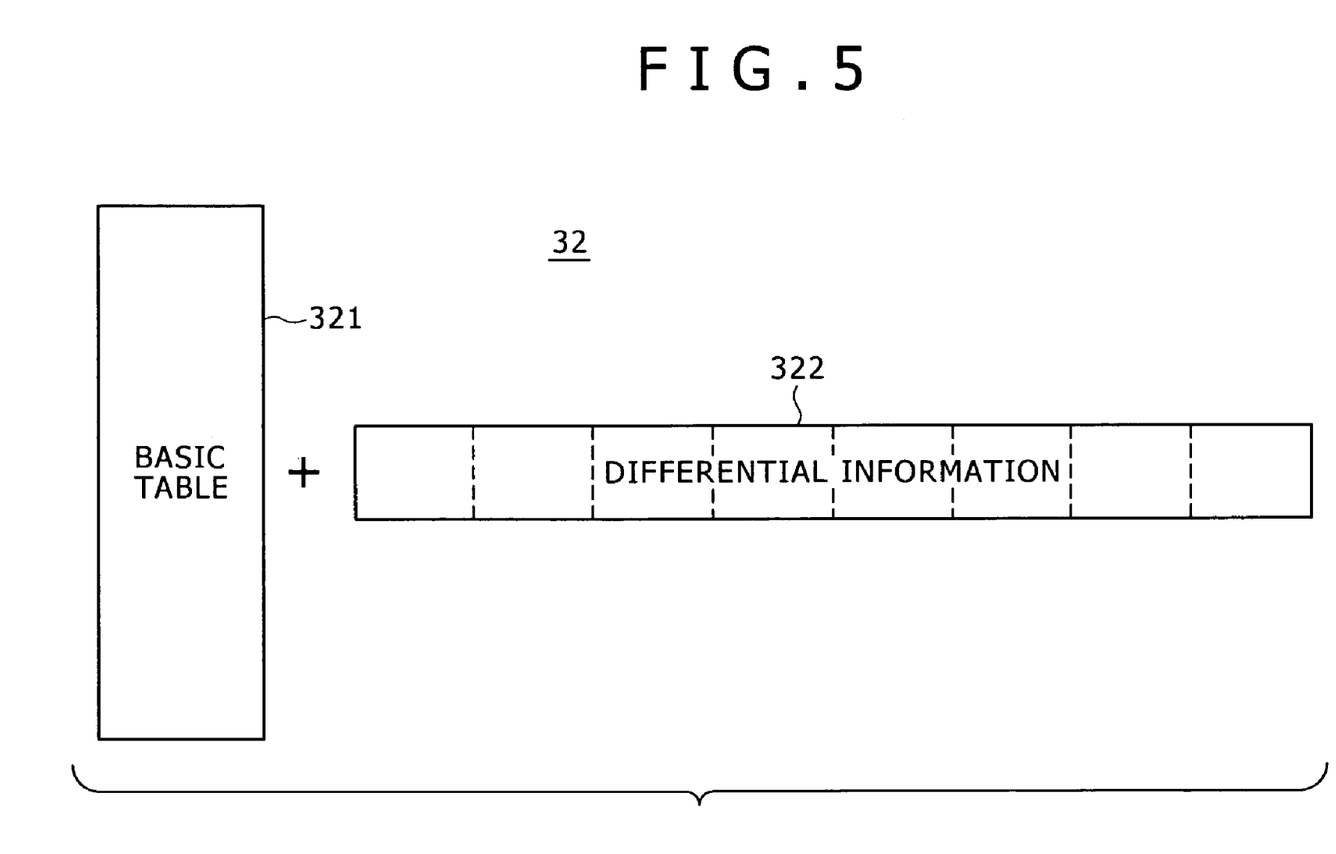
FIG. 5 is a diagrammatic view illustrating a basic table and a differential information table included in management information used in the nonvolatile memory system.

The controller 3 of the nonvolatile memory system 1 of the present embodiment is characterized in that the size of the management information of the nonvolatile memory which exhibits a great size if the management information is retained as it is reduced by dividing the management information into a basic table 321 which collectively manages a plurality of blocks/banks and a differential information table 322 between blocks/banks.

For example, if the nonvolatile memory unit 2 which includes a plurality of banks is managed by merely collecting banks in order to reduce the management information size, then the number of failed blocks increases apparently. However, by replacing a failed block with a non-failed block for each bank using the differential information, there is an advantage that the apparently failed block size is not increased while the management information size is kept suppressed.

Figure 6:
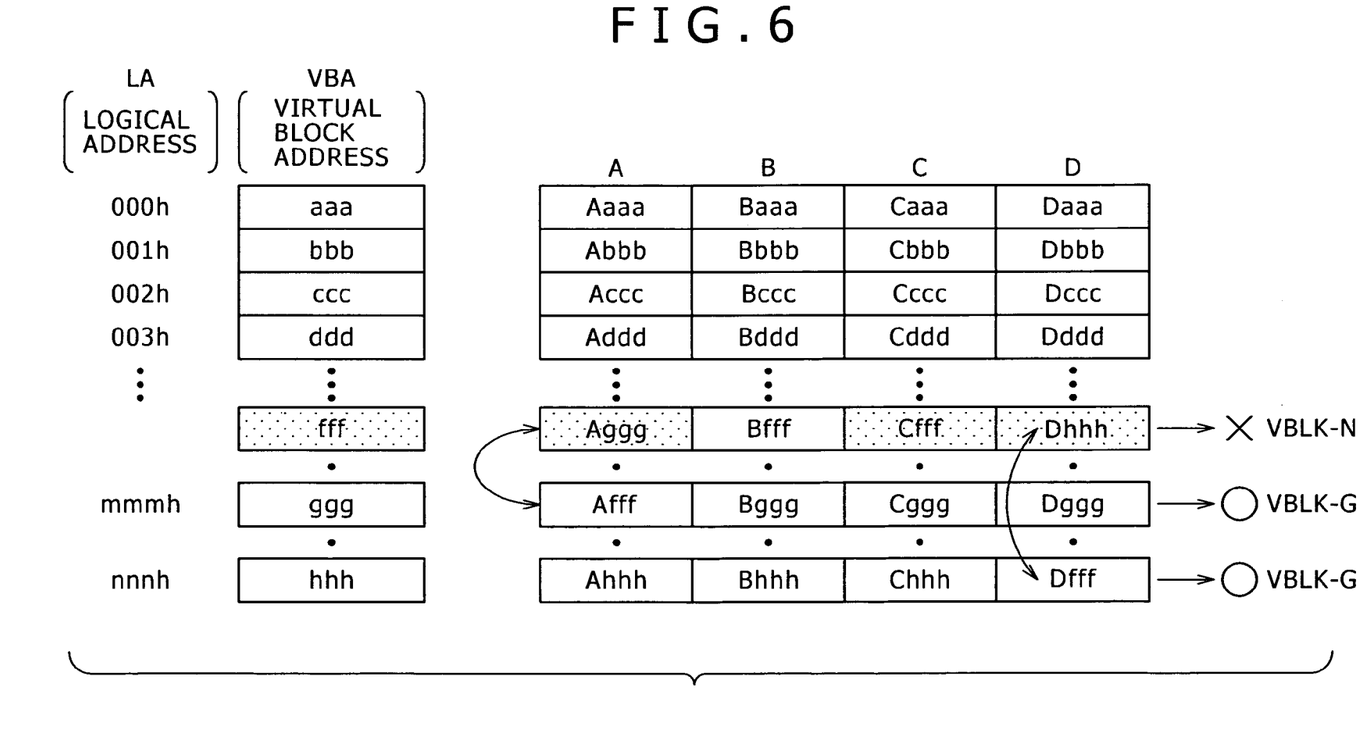
FIG. 6 is a diagrammatic view illustrating a manner of conversion from a logical address into a virtual block address and conversion of a virtual block address into an address to be used upon accessing to a memory bank in the nonvolatile memory system.

FIG. 6 illustrates a manner of conversion from a logical address LA into a virtual block address VBA and conversion from the virtual block address VBA into an address to be used for accessing to the memory banks 2-1 to 2-4 in the nonvolatile memory system 1 of the present embodiment.

In a normal virtual block VBLK wherein no failure occurs with corresponding memory blocks BLK, memory accessing is performed using an address of the virtual block VBLK to which an identifier representing a bank is added.

The identifier representing a bank may be any identifier which indicates the bank, such as a bank address, a chip select signal or a channel number.

On the other hand, virtual blocks VBLK wherein failure occurs with one or more of corresponding memory blocks BLK are classified into a virtual block VBLK-N to be actually treated as a failed virtual block and virtual blocks VBLK-G not to be treated as failed virtual blocks. Then, a block (Afff or Dfff) which is not a failed block in the virtual block to be treated as a failed virtual block and a failed block (Aggg or a Dhhh) of another virtual block which is not to be treated as a failed virtual block are exchanged for each other in the same bank.

By such exchange, blocks corresponding to those virtual blocks VBLK-G which are not to be treated as failed virtual blocks become normal or non-failed blocks, and, therefore, memory accessing is performed using addresses of the blocks.

It is to be noted that it is also possible to treat a virtual block wherein no failure occurs with the corresponding memory blocks as a failed virtual block. In this instance, it is possible to set a virtual block determined in advance as the failed virtual block.

Also, it is possible to perform exchange between a non-failed block and a failed block across banks. In this instance, even where the number of failed blocks is different among different banks, failed blocks can be treated such that they occur equally among the banks.

Figure 7:
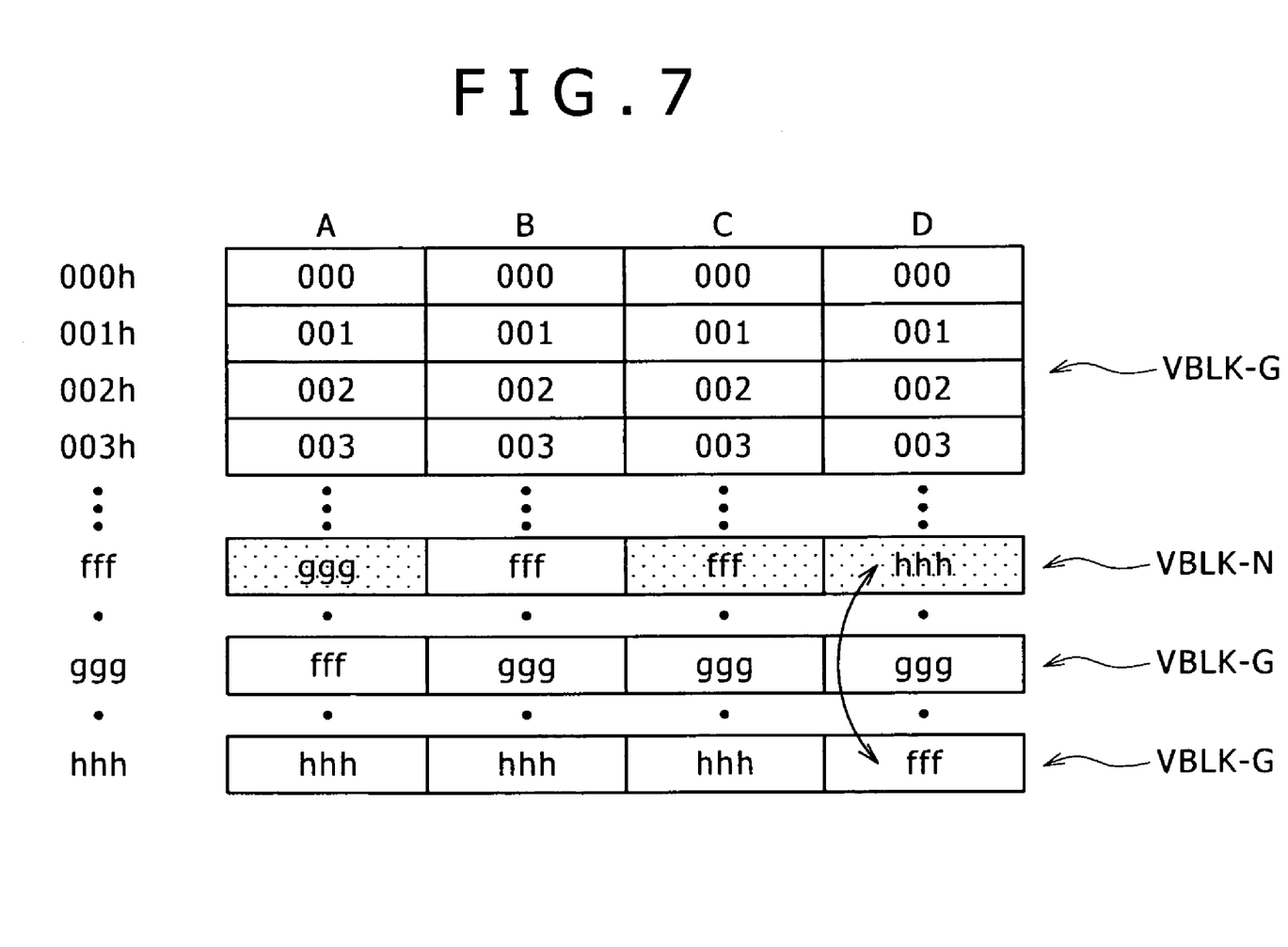
FIG. 7 is a diagrammatic view illustrating a physical address to physical address conversion table wherein all virtual block addresses and access addresses of memory banks are coordinated with each other.
Figure 8:
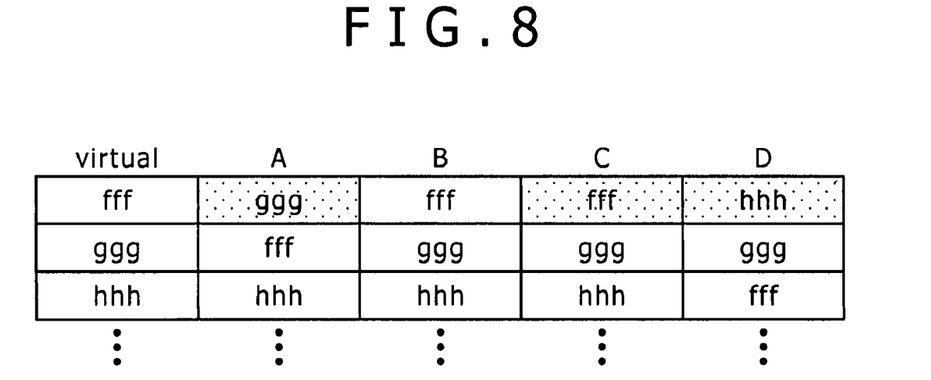
FIG. 8 is a diagrammatic view illustrating a physical address to physical address conversion table wherein virtual block addresses at which replacement of a block occurs and access addresses of the banks are coordinated with each other.
Figure 9:
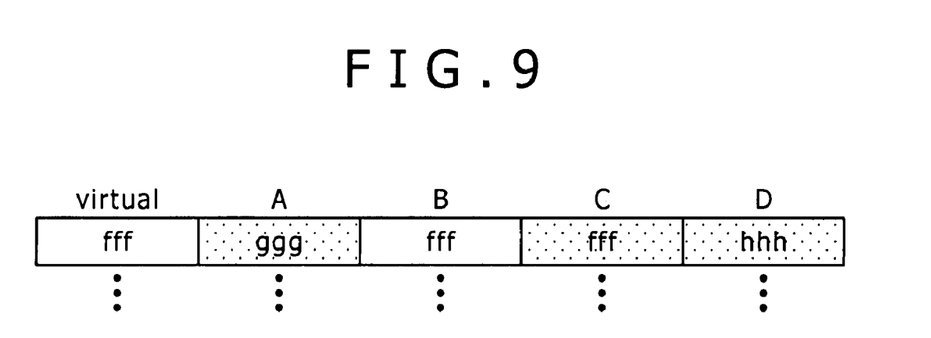
FIG. 9 is a diagrammatic view illustrating a physical address to physical address conversion table wherein a virtual block address of a block to be treated as a failed block and access addresses of the banks are coordinated with each other.

FIGS. 7, 8 and 9 illustrate tables representing coordinated relationships in exchange between a failed block and a non-failed block.

FIG. 7 illustrates a physical address to physical address convertible table wherein all virtual block addresses and access addresses of the banks are coordinated with each other.

Referring to FIG. 7, in a virtual block VBLK-G which does not include a failed block, for example, in a virtual block address 000h, the corresponding access addresses of the banks are all the same 000h.

In the virtual block VBLK-N which includes failed blocks, the access address of the bank A corresponding to the virtual block address fff is set to ggg and the access address of the bank D corresponding the virtual block address fff is set to hhh, thereby to replacing entries at the access addresses with corresponding entries at the virtual block addresses ggg and hhh.

Consequently, an access address of a block which is not a failed block is allocated to each of the virtual block addresses ggg and hhh, and the block can be treated as a non-failed virtual block. The virtual block address fff is determined as a failed virtual block address and inhibited from being used.

FIG. 8 illustrates another physical address to physical address conversion table wherein the virtual block addresses between which exchange of blocks occurs and the access addresses of the banks are coordinated with each other.

Referring to FIG. 8, since the number of failed blocks which may appear is limited, there is no necessity to provide a table for all virtual blocks, but the table may include those virtual block addresses between which exchange occurs.

In this instance, it is necessary for the address generation section 31 to decide whether or not a certain virtual block address VBA is included in columns of virtual addresses of the table and perform access address exchange if the address is included.

FIG. 9 illustrates a further physical address to physical address conversion table wherein a virtual block address to be treated as a failed virtual block address and access addresses of the banks are coordinated with each other.

When address exchange is performed, since a virtual block to be treated as a failed virtual block and another virtual block to be treated as a non-failed virtual block are exchanged for each other, it also is possible to provide a table which includes only those virtual blocks which are to be treated as failed virtual blocks.

In this instance, it is necessary to decide whether or not a certain virtual address is included in access addresses of the banks and perform access address exchange if the certain virtual address is included.

Figure 10:
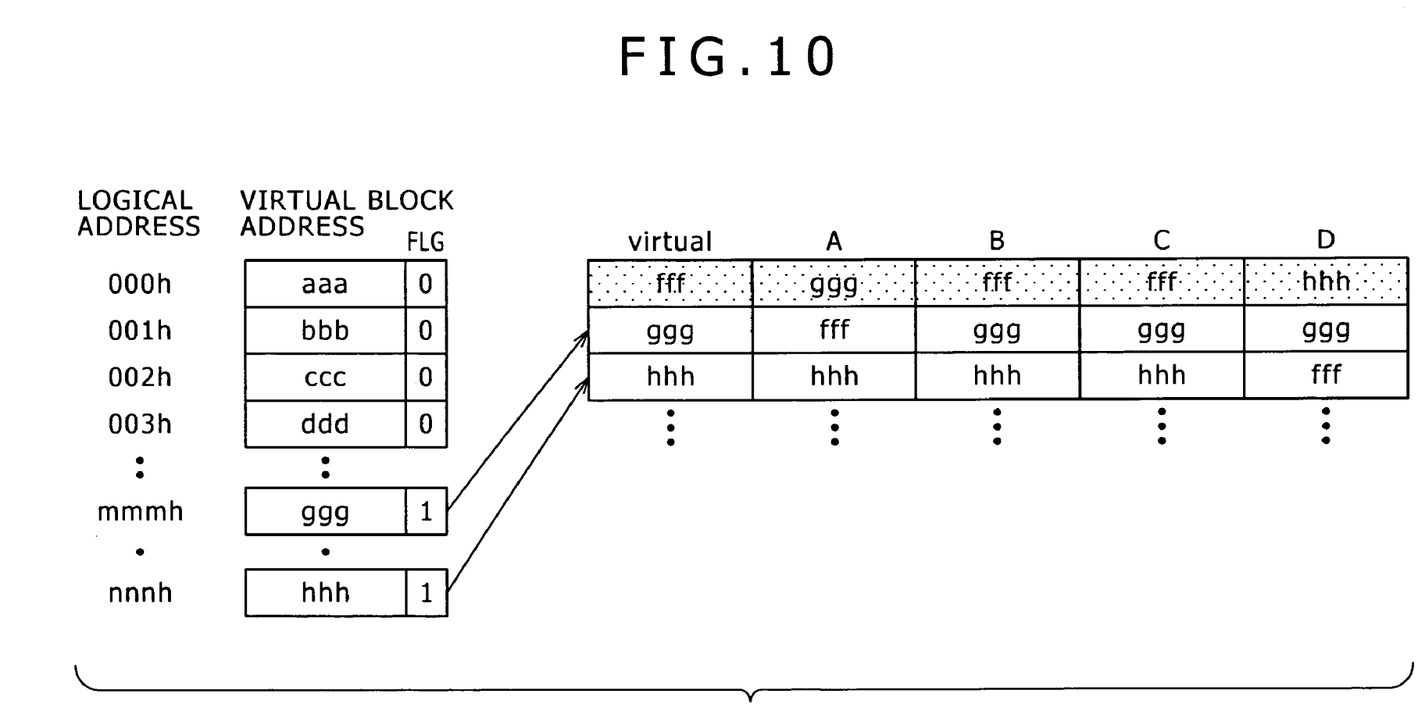
FIG. 10 is a diagrammatic view illustrating a logical to physical-physical to physical conversion table wherein a flag of 1 bit is added in a physical address field of a logical to physical table.
Figure 11:
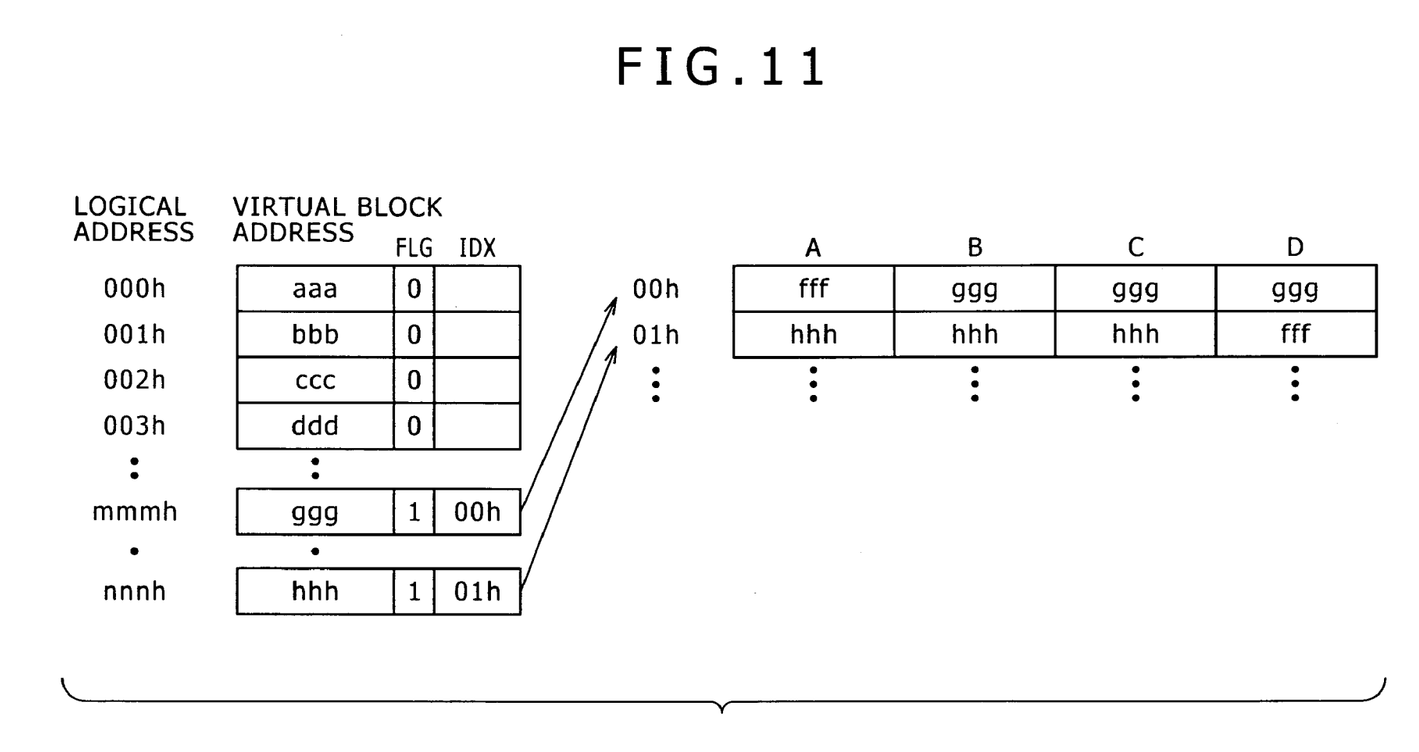
FIG. 11 is a diagrammatic view illustrating a logical to physical-physical to physical conversion table wherein an index to a corresponding table is added to a physical address field with regard to which access address exchange of a logical address to physical address conversion table is to be performed.

FIGS. 10 and 11 illustrate different manners in which, in a system wherein physical address to physical address (=virtual block address) conversion is performed, a virtual block address which is an object of access address conversion that is marked on a logical address to physical address conversion table in order to represent whether or not exchange is to be performed.

FIG. 10 illustrates an example wherein a flag of 1 bit is provided in a physical address field of a logical address to physical address conversion table.

A physical address with regard to which the flag FLG is "0" is used as it is as an access address for the banks, but a physical address with regard to which the flag FLG is "1" is exchanged for another physical address using such a table as illustrated in FIG. 8 or 9.

FIG. 11 illustrates another example wherein an index to a corresponding table is added to a physical address field with regard to which access address exchange of a logical address to physical address conversion table is to be performed.

By using an index IDX indicated in the physical address field with regard to a physical address for which access address exchange is to be performed, an access address to be used for exchange can be obtained.

Figure 12:
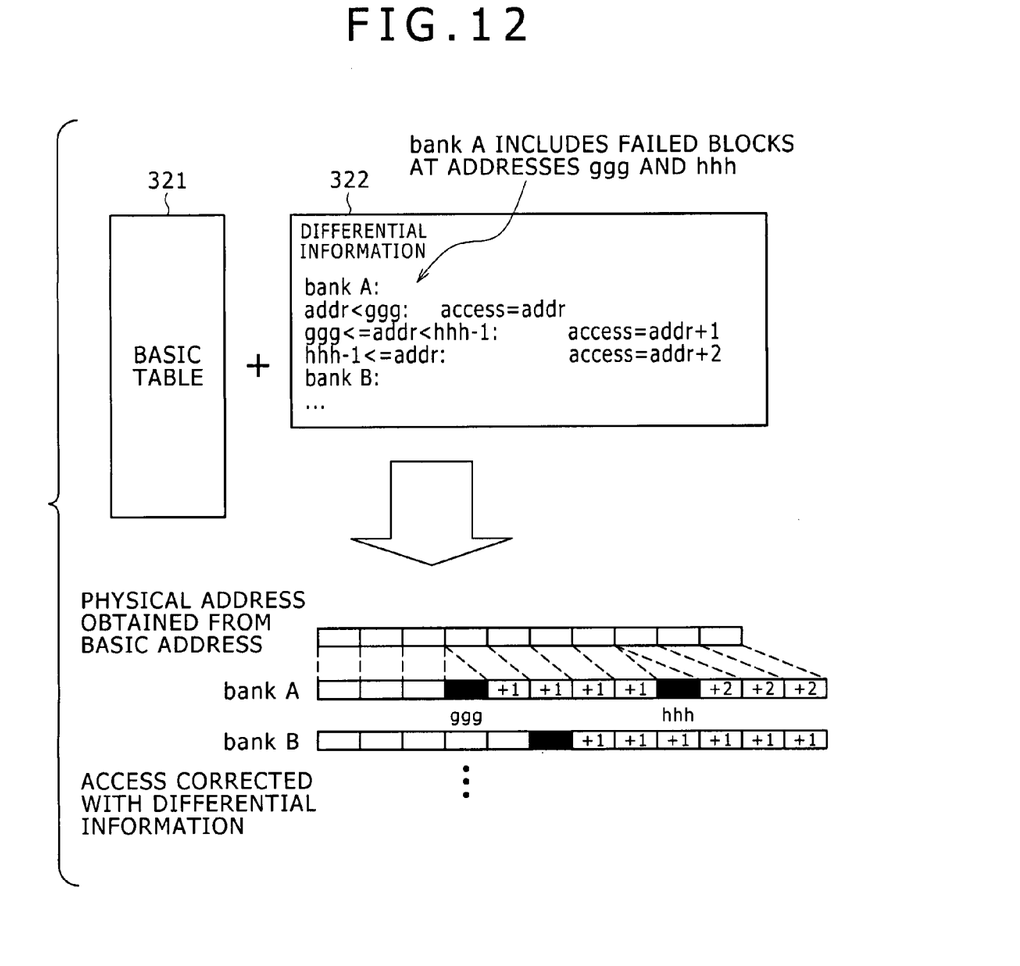
FIG. 12 is a diagrammatic view illustrating an example of a replacement process for a failed block which uses differential information executed by the nonvolatile memory system.

FIG. 12 illustrates an example of a replacement process of a failed block using differential information in the nonvolatile memory system 1 of the present embodiment.

In the example illustrated in FIG. 12, when a failed block exists on the nonvolatile memory, the block is skipped and an address is shifted upon accessing to any succeeding address, thereby performing a replacement process of the failed block, and information for the replacement process is retained as differential information.

Figure 13:
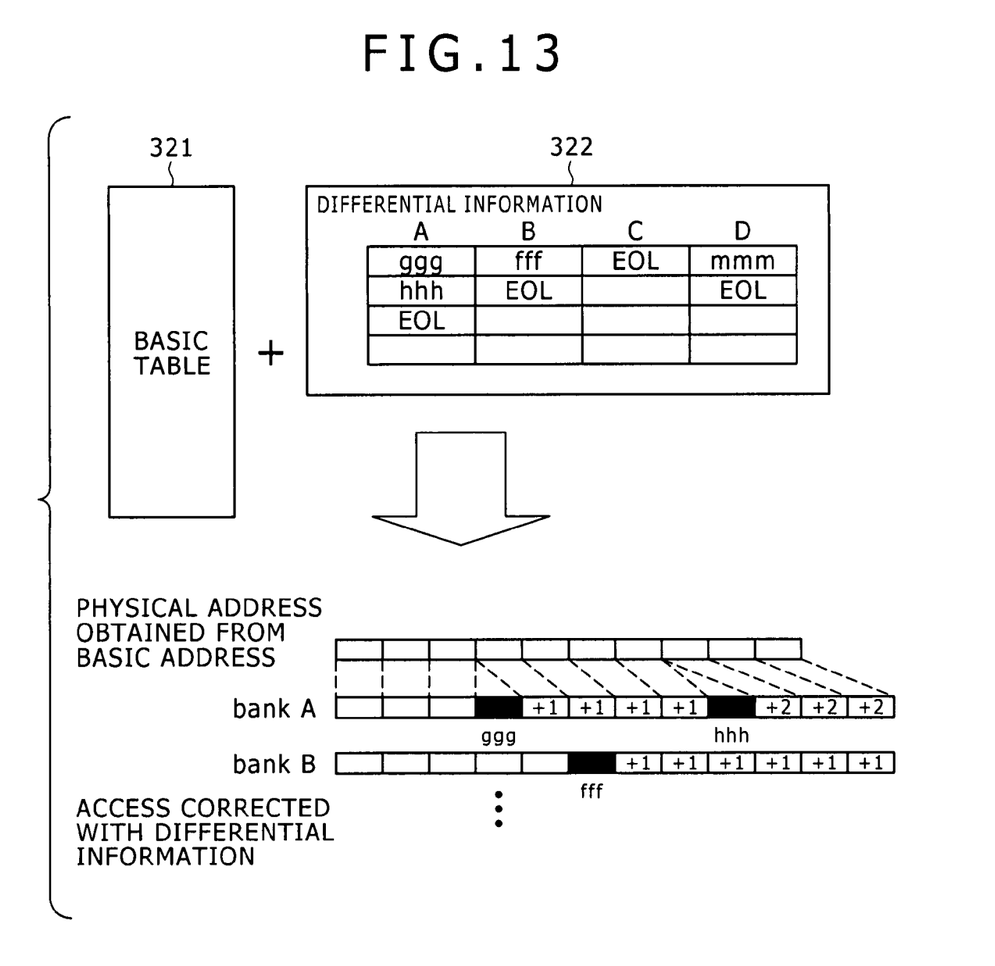
FIG. 13 is a diagrammatic view illustrating an example of the differential information used in the replacement process for a failed block.

FIG. 13 illustrates an example of the differential information used in the replacement process for a failed block illustrated in FIG. 12.

In the example of FIG. 13, the differential information 322 is given as lists in each of which addresses of failed blocks of a bank are arranged in an ascending order.

The last end of each list is indicated by an EOL (End Of List) and may have a value higher than a maximum address of the bank.

Figure 14:
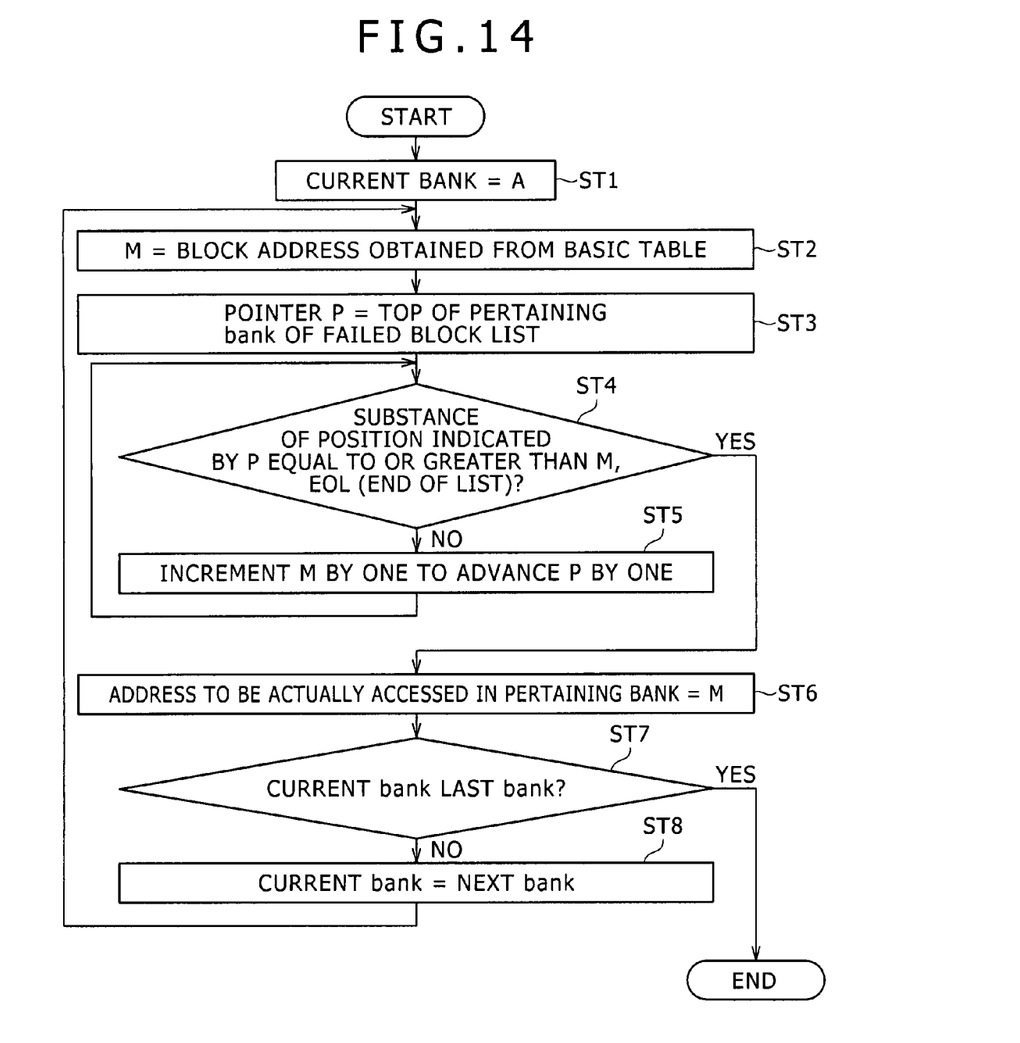
FIG. 14 is a flow chart illustrating an address exchange flow executed by the nonvolatile memory system where the differential information is used.

FIG. 14 illustrates an address exchange flow where the differential information is used.

Referring to FIG. 14, in the address conversion process illustrated, a current bank is set to A, and a block address obtained from the basic table 321 is represented by M, whereafter the top of the pertaining bank of the failed block list is set to a pointer P (steps ST1 to ST3).

Then, it is decided whether or not the substance of the position indicated by the pointer P is equal to or greater than the block address M obtained from the basic table 321 (step ST4).

If it is decided at step ST4 that the substance of the position indicated by the pointer P is not equal to or greater than the block address M obtained from the basic table 321, then the block address M is incremented by one and the pointer P is advanced by one (step ST5). Thereafter, the decision process at step ST4 is performed.

On the other hand, if it is decided at step ST4 that the substance at the position of the pointer P is equal to or greater than the block address M obtained from the basic table 321, then the address to be accessed actually in the pertaining bank is set to M (step ST6).

Thereafter, it is decided whether or not the current bank is the last bank (step ST7).

If it is decided at step ST7 that the current bank is not the last bank, the current bank is set to the next bank (ST8), and then the processing returns to step ST2 to repeat the processes at step ST2 et seq. with regard to the new current bank.

On the other hand, if it is decided at step ST7 that the current bank is the last bank, then the processing is ended.

In summary, a block address common to the banks obtained from the basic table 321 is compared with lists of failed blocks provided as differential information, and the address is incremented by a necessary value thereby to generate an address to be used in actual accessing for each bank.

By this, an operation of skipping a failed block to shift an address can be performed.

As described above, the nonvolatile memory system 1 according to the present embodiment is configured such that it includes the controller 3 configured to manage the nonvolatile memory unit 2 based on management information, the management information of the controller 3 includes a basic table for collectively managing a plurality of blocks and differential information between the blocks, and the controller is operable to manage the blocks collectively with the basic table and manage different portions of the blocks within the collected range using the differential information. Therefore, the following advantages can be anticipated.

In particular, since the address management system in a system which uses a nonvolatile memory is improved significantly, fine management can be achieved while the management table size is kept small.

For example, it is possible to y reduce the number of apparently failed blocks significantly, and the utilization efficiency of the blocks is improved significantly. The improvement of the utilization efficiency results in an increase of the effective capacity and a reduction of the system cost.

Further, the number of blocks of an object of management can be increased without deteriorating the utilization efficiency while the management table size is kept small. Consequently, a nonvolatile memory system of a large storage capacity can be constructed.

While a preferred embodiment of the present invention has been described using specific terms, such description is for illustrative purposes only, and it is to be understood that changes and variations may be made without departing from the spirit or scope of the following claims.

What is claimed is:

1. A nonvolatile memory system, comprising:
a nonvolatile memory; and
a controller configured to manage said nonvolatile memory based on management information;
the management information of said controller including a basic table for collectively managing a plurality of blocks and differential information between the blocks;
said controller being operable to manage the blocks collectively with the basic table and manage different portions of the blocks within a collected range using the differential information,
wherein said controller includes a physical address to physical address conversion table for block replacement as the differential information,
wherein said controller sets a flag to an object of the physical address to physical address conversion on a logical address to physical address conversion table which is used as the basic table,
wherein said controller adds an index to a conversion table to a block of an object of the physical address to physical address conversion on the logical address to physical address conversion table which is used as the basic table.

2. A nonvolatile memory system comprising:
memory blocks within a memory bank;
a conversion table configured to convert a logical address into a virtual block address,
wherein said virtual block address is converted into a bank internal address, said bank internal address being an address for accessing one of the memory blocks,
wherein a failed virtual block and a non-failed virtual block are exchanged for each other, failure occurring in said failed virtual block and no failure occurring in said non-failed virtual block.

3. The nonvolatile memory system according to claim 2, wherein said failed virtual block and said non-failed virtual block are within said memory bank.

4. The nonvolatile memory system according to claim 2, wherein other memory blocks are within another memory bank.

5. The nonvolatile memory system according to claim 4, wherein said failed virtual block is within said memory bank and said non-failed virtual block is within said another memory bank.

6. The nonvolatile memory system according to claim 4, wherein said failed virtual block for said memory bank and a failed virtual block for said another memory bank are assigned said virtual block address, failure occurring in said failed virtual block for said another memory bank.

7. The nonvolatile memory system according to claim 4, wherein said failed virtual block is one of the memory blocks, said non-failed virtual block being one of the other memory blocks.

8. The nonvolatile memory system according to claim 2, wherein a flag within said virtual block address indicates an exchange between said failed virtual block and said non-failed virtual block.

9. The nonvolatile memory system according to claim 8, wherein an index within said virtual block address is used for said exchange.

10. The nonvolatile memory system according to claim 2, wherein said bank internal address is shifted to a succeeding address upon encountering a failed one of the memory blocks.

11. The nonvolatile memory system according to claim 2, wherein said memory bank is within nonvolatile memory.

12. The nonvolatile memory system according to claim 2, wherein said failed virtual block is one of the memory blocks, said non-failed virtual block being a different one of the memory blocks.

* * * * *